Figure 1:
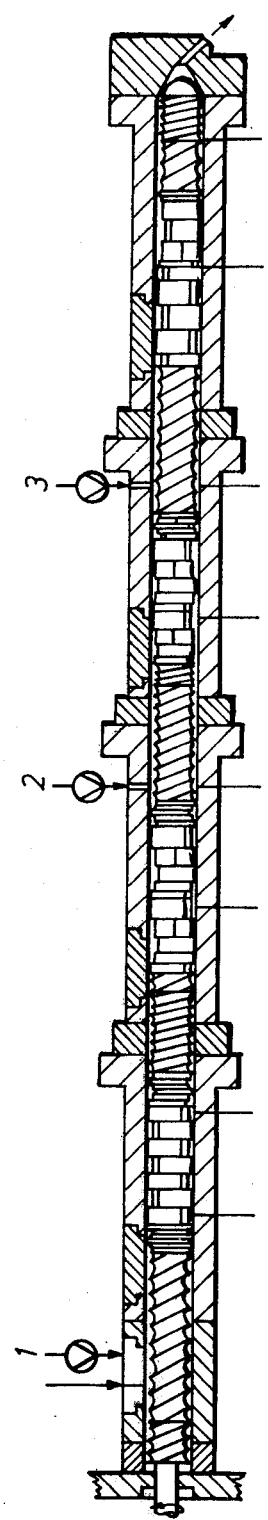

United States Patent [19]

Baurecht et al.

[11] 4,000,157
[45] Dec. 28, 1976

[54] PROCESS FOR THE TREATMENT OF EFFLUENT FROM THE SYNTHESIS OF COPPER PHTHALOCYANINE

[75] Inventors: Heinz-Ewald Baurecht; Reinhold Hörnle; Gerd Müller, all of Cologne, Germany

[73] Assignee: Bayer Aktiengesellschaft, Leverkusen, Germany

[22] Filed: Oct. 7, 1975

[21] Appl. No.: 620,311

[30] Foreign Application Priority Data
Oct. 12, 1974 Germany .................. 2448773

[52] U.S. Cl. .................................. 260/314.5
[51] Int. Cl.[2] ................................ C07D 487/22
[58] Field of Search ....................... 260/314.5

[56] References Cited
UNITED STATES PATENTS 3,519,641   7/1970   Nitzschmann et al. ....... 260/314.5

Primary Examiner—Henry R. Jiles
Assistant Examiner—Robert T. Bond
Attorney, Agent, or Firm—Plumley and Tyner

[57] ABSTRACT

The effluent produced in the production of copper phthalocyanine according to the usual methods, containing by-products of the reaction and copper and molybdenum salts is advantageously purified by bringing it to a pH of between 3 and 9 and separating off the precipitate. The precipitate can be added to the starting components of the copper phthalocyanine production.

4 Claims, 1 Drawing Figure

PROCESS FOR THE TREATMENT OF EFFLUENT FROM THE SYNTHESIS OF COPPER PHTHALOCYANINE

Copper phthalocyanine (CuPc) is in the main prepared according to two types of process, which differ in respect of their starting components, namely the phthalodinitrile process and the phthalic anhydride/urea process.

In the phthalodinitrile process, phthalic acid dinitrile is reacted with a Cu(I) salt, for example $Cu_2Cl_2$, if appropriate in an inert solvent and/or in the presence of a catalyst, at temperatures of up to 250° C, the solvent, where present, is removed by filtration and the crude CuPc is extracted by boiling with dilute mineral acid.

In the phthalic anhydride/urea process, phthalic anhydride is reacted with urea and a Cu(II) salt in the presence of a catalyst, in general ammonium molybdate or $MoO_3$, if appropriate in an inert solvent such as, for example, trichlorobenzene or nitrobenzene, at temperatures between 150° and 300° C, the solvent, if present, is removed, for example by filtration or distillation in vacuo, and the crude CuPc is extracted by boiling with dilute mineral acid. This gives yields of only between 70 and 90% of theory, relative to phthalic anhydride or Cu salt, though an excess of urea is employed, in most cases 3 – 6 mols per mol of phthalic anhydride.

The effluent produced contains the by-products of the reaction, namely condensation products of phthalic anhydride with urea and their dehydration and deamination products of all kinds, such as, for example, phthalimide or 3-keto-iminoisoindolenine, water-soluble urea degradation products such as biuret or cyanuric acid, ammonium salts which cannot be sublimed off, and unconverted Cu salt and the Mo salt employed. As a result of boiling with dilute mineral acid, the condensation products of phthalic anhydride and urea are saponified to give sparingly soluble phthalimide, which is difficult to degrade biologically. Because of their general toxicity towards micro-organisms and higher organisms, the heavy metal salts must be removed. The urea degradation products have a high biological oxygen demand.

The Cu present in solution can be removed, for example, by precipitation as the sulphide and subsequent filtration. Under these conditions, the Mo is frequently not co-precipitated quantitatively, so that a subsequent treatment with an ion exchanger is frequently necessary. The CuS formed is valueless as such and must be dumped or must be re-processed by adding it to normal Cu ore in a copper smeltery. The Cu salt can also be removed directly by means of an ion exchanger but this is expensive.

Surprisingly, a process has now been found which is able to solve, or at least to reduce, in a simple manner all the effluent treatment problems which have been described, by bringing the effluent containing mineral acid and Cu salt to a pH of between 3 and 9, preferably between 4 and 8, for example with NaOH, KOH, Ca(OH)$_2$, $Na_2CO_3$ or $K_2CO_3$. Hereupon, the Cu precipitates practically quantitatively as hydroxide or basic copper salt and the reaction products of phthalic anhydride with ammonia or urea, which have been saponified to phthalimide during the prior extraction by boiling with acid, are at the same time co-precipitated practically quantitatively as almost pure phthalimide (analysis: 65.25% C, 9.7% N; calculated for phthalimide: 65.3% C, 9.5% N). A further surprising advantage of the process is that the Mo is very largely co-precipitated so that either an after-purification can be dispensed with or the residual Mo is removed completely, without great effort, by means of an ion exchanger, the ion exchanger can again be regenerated and the eluate can again be added to the effluent before precipitating the Cu.

A further unforeseeable advantage of the process is that even a not inconsiderable part of the readily water-soluble urea degradation products and even a part of the ammonium ions are co-precipitated during the precipitation process. This substantially reduces the biological oxygen demand.

A particularly important advantage of the process is that the precipitate obtained in accordance with the process of the invention can, after drying, again be added to the starting components, so that practically 100% yield, relative to Cu salt and phthalic anhydride, results. Furthermore it is not necessary constantly to add new catalyst to the process since the catalyst is always recovered and recycled in an active form. Because of the simple and economical manner of recovery and recycling of the reaction by-products it is furthermore not necessary to maximise the yield of the synthesis step, which inter alia has the consequence that it is possible to dispense with some of the large excess of urea as a result of which the flue gas problems, but above all the biological oxygen demand of the effluent, can be greatly restricted without substantially impairing the economics of the process.

In addition to coping better with the problems of effluent treatment, the recovery and recycling of the reaction by-products and of the unconverted reactants, and the yield of up to 100%, relative to Cu salt and phthalic anhydride, achievable thereby, the recovery of the catalyst and the better utilisation of the urea are of outstanding importance.

The advantages of the process of effluent treatment according to the invention are particularly important when using solvent-free synthesis processes or using processes which use small amounts of water-soluble or acid-soluble solvents, since in that case the entire reaction by-products pass into the effluent from the extractive boiling with acid. In order fully to be able to utilise the advantages of the process according to the invention even when using water-insoluble solvents, it is necessary first to distil off the solvent and then to extract the product by boiling with acid.

The combination of a method of synthesis in accordance with the phthalic anhydride/urea process, which is carried out without solvents, with the process according to the invention for the treatment of effluent and recycling of the recovered substances is preferred.

Methods of synthesis which operate continuously are particularly preferred.

Further, the combination of solvent-free methods of synthesis — continuous kneading with salt — effluent treatment according to the invention, and recycling of the precipitate produced, is furthermore particularly preferred.

Of course it is also possible to use the effluent treatment process according to the invention in working up the effluent obtained from the phthalodinitrile process. However, a direct re-use of the precipitate formed is only possible with a mixed phthalodinitrile-phthalimide/urea process.

EXAMPLE 1

104.0 kg of phthalic anhydride, 168.0 kg of urea, 20.1 kg of basic Cu carbonate containing 54 – 56% of Cu and 0.8 kg of ammonium molybdate are fed hourly to a 125 l AP-Conti reactor from Messers. List, Pratteln/Switzerland. The main shaft is rotated at 10 revolutions per minute and the temperature of the heating oil is adjusted so that the reaction mixture reaches a temperature of 225° C in the last third of the reactor. The reaction mixture is extracted by boiling with 5% strength HCl and the crude pigment is filtered off hot.

The waste liquor was adjusted to pH 6.0 with sodium carbonate at 80° C, and the precipitate was filtered off.

An analysis of the filtrate gave the following values: 0.001% of Cu, 0.005% of Mo, 0.15% of C, 0.12% of total N and 0.07% of $NH_3$.

The precipitate was dried and the copper content was determined to be 7.3%.

10.0 g of the dried precipitate and 7.0 g of urea were then heated to 230° C for half an hour and gave 4.8 g of CuPc.

EXAMPLE 2

A kneader screw of type ZSK-53 of Messers. Werner and Pfleiderer, Stuttgart, with a kneading fitting as shown in FIG. 1, is fed with 10.2 kg/hour of the CuPc crude pigment which have been prepared as indicated in Example 1, and 41 kg/hour of sodium chloride. About 5.9 kg/hour of diethylene glycol are metered in through the feed nozzle 1, 0.935 kg/hour via nozzle 2 and 1.25 kg/hour via nozzle 3. The screw speed is set to 295 revolutions per minute and the larger amount of diethylene glycol is readjusted so that the power taken by the kneading screw is 28 kW. The apparatus is cooled over its entire length with water at 88° C, flowing through at about 1,000 l/hour. The kneaded mass which issues is extracted by boiling with 2.5 kg of 5% strength hydrochloric acid for 2 hours and filtered hot and the press cake is washed with water until free from acid and dried at 80° C.

A part of the waste liquor was adjusted to 6.0 with NaOH and the precipitate was filtered off.

An analysis of the filtrate gave the following values: 0.003% of Cu, 0.0015% of Mo, 0.10% of C, 0.10% of total N and 0.05% of $NH_3$.

The other part of the waste liquor was adjusted to pH 6.0 with sodium carbonate and the precipitate was filtered off.

An analysis of this filtrate gave the following values: 0.005% of Cu, 0.002% of Mo, 0.11% of C, 0.09% of total N and 0.04% of $NH_3$.

We claim:

1. A process for the preparation of copper phthalocyanine in accordance with the phthalic anhydride/urea process, characterized in that the reaction product is treated with a dilute mineral acid, separating off the precipitated copper phthalocyanine, adjusting the pH of the mother liquor to a range of 3–9, separating the resultant precipitated starting materials, drying said starting materials and reusing them for the synthesis of copper phthalocyanine.

2. The process of claim 1 wherein the pH is adjusted to a range of 4–8.

3. The process of claim 1 characterized in that it is carried out continuously.

4. A process for the treatment of the mother liquor obtained from the synthesis of copper phthalocyanine in accordance with the phthalic anhydride/urea process after treating the reaction product with dilute mineral acid, characterized in that the mother liquor is adjusted to a pH of 3–9 and the products which hereupon precipitate are separated.

* * * * *